(12) United States Patent
Rezanezhad Gatabi (10) Patent No.: US 11,365,987 B2
(45) Date of Patent: Jun. 21, 2022

(54) METAL DETECTOR, VIBRATION, LINEAR AND ROTATIONAL SPEED AND POSITION MEASUREMENT DEVICE USING A SMARTPHONE OR SOUND PLAYER/RECORDER INSTRUMENT

(71) Applicant: Javad Rezanezhad Gatabi, San Marcos, TX (US)

(72) Inventor: Javad Rezanezhad Gatabi, San Marcos, TX (US)

( * ) Notice: Subject to any disclaimer, the term of this patent is extended or adjusted under 35 U.S.C. 154(b) by 0 days.

(21) Appl. No.: 16/207,083

(22) Filed: Nov. 30, 2018

(65) Prior Publication Data

US 2019/0277663 A1 Sep. 12, 2019

Related U.S. Application Data

(60) Provisional application No. 62/592,421, filed on Nov. 30, 2017.

(51) Int. Cl.
*G01D 5/20* (2006.01)
*G01P 3/50* (2006.01)
*G01P 3/44* (2006.01)
*G01V 3/165* (2006.01)
*G01V 3/15* (2006.01)

(52) U.S. Cl.
CPC .............. *G01D 5/204* (2013.01); *G01P 3/44* (2013.01); *G01P 3/50* (2013.01); *G01V 3/15* (2013.01); *G01V 3/165* (2013.01)

(58) Field of Classification Search
CPC . G01V 3/10; G01V 3/104; G01V 3/15; G01V 3/165; G01D 5/204
See application file for complete search history.

(56) References Cited

U.S. PATENT DOCUMENTS

| | | | | | |
|---|---|---|---|---|---|
| 4,423,377 | A | * | 12/1983 | Podhrasky | G01V 3/107 324/133 |
| 5,148,151 | A | * | 9/1992 | Podhrasky | G01V 3/105 324/329 |
| 6,552,512 | B1 | * | 4/2003 | Harris | H02J 7/0069 320/107 |
| 8,336,771 | B2 | * | 12/2012 | Tsai | G06K 19/0711 235/380 |
| 8,925,807 | B2 | * | 1/2015 | Utley | H02J 7/35 235/380 |
| 9,799,025 | B2 | * | 10/2017 | Skoog | G07F 7/0873 |

(Continued)

FOREIGN PATENT DOCUMENTS

| | | | | |
|---|---|---|---|---|
| EP | 1990658 A1 | * | 11/2008 | G01V 3/15 |
| UA | 126460 U | * | 6/2018 | F41H 11/136 |

OTHER PUBLICATIONS

Sobral, G A; "Development of a metal detector for smartphones and its use in the teaching laboratory"; Apr. 30, 2018; IOP Publishing Ltd.; Physics Education, vol. 53, No. 4; pp. 1-10 (Year: 2018).*

*Primary Examiner* — John Villecco (57) ABSTRACT

This invention presents a novel metal detector device and method that employs the performance of the current compact sound recorder/player systems such as Tape/CD/DVD players, MP3 players, Cell phones, Tablets, Laptops to make a compact metal detector. This invention also enables the use of said sound recorder/player systems for precise Vibration, Linear and Rotational Speed and Position Measurements.

18 Claims, 8 Drawing Sheets

(56) References Cited

U.S. PATENT DOCUMENTS

| | | | |
|---|---|---|---|
| 10,191,177 B2* | 1/2019 | Greuet | G06F 3/046 |
| 2006/0133633 A1* | 6/2006 | Hyvonen | H04R 25/558 |
| | | | 381/315 |
| 2008/0150537 A1* | 6/2008 | Westersten | G01V 3/105 |
| | | | 324/326 |
| 2009/0315707 A1* | 12/2009 | Candy | G01V 3/104 |
| | | | 340/540 |
| 2010/0283467 A1* | 11/2010 | Candy | G01V 3/107 |
| | | | 324/326 |
| 2012/0049850 A1* | 3/2012 | Reime | G01V 3/15 |
| | | | 324/329 |
| 2012/0293001 A1* | 11/2012 | Chan | H02J 7/0068 |
| | | | 307/66 |
| 2012/0321115 A1* | 12/2012 | Jylanki | H04R 25/554 |
| | | | 381/331 |
| 2014/0001881 A1* | 1/2014 | Murakami | H02J 50/60 |
| | | | 307/104 |
| 2014/0265642 A1* | 9/2014 | Utley | H02J 7/35 |
| | | | 307/151 |
| 2015/0042307 A1* | 2/2015 | Cholayil | G01R 29/085 |
| | | | 324/66 |
| 2016/0055478 A1* | 2/2016 | Skoog | G06Q 20/322 |
| | | | 705/17 |
| 2020/0195051 A1* | 6/2020 | Smith | G01V 3/10 |
| 2020/0213434 A1* | 7/2020 | Samkov | G01V 3/10 |
| 2020/0341164 A1* | 10/2020 | Blankenship | H04M 1/72415 |

\* cited by examiner

METAL DETECTOR, VIBRATION, LINEAR AND ROTATIONAL SPEED AND POSITION MEASUREMENT DEVICE USING A SMARTPHONE OR SOUND PLAYER/RECORDER INSTRUMENT

CROSS-REFERENCE TO RELATED APPLICATIONS

This application claims the benefits of U.S. provisional application No. 62/592,421, filed on Nov. 30, 2017.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Metal detectors require costly, precise analog and digital circuits for accurate timing, detection, analysis, and alarming/monitoring process. A complex metal detector system has a large physical volume, heavy weight, and requires time consuming production, calibration, and test process. While the current metal detection technologies are known for their high production and maintenance costs, the issue of the weight and volume seriously limits their application. This invention presents a novel metal detector device and method that employs the performance of the current compact sound recorder/player systems such as Tape/CD/DVD players, MP3 players, Cell phones, Tablets, Laptops to make a compact metal detector. This invention also enables the use of said sound recorder/player systems for precise Vibration, Linear and Rotational Speed and Position Measurements.

BRIEF SUMMARY OF THE INVENTION

This invention introduces a metal detector device and a metal detecting technology to use the input and/or output channel(s) of a wave or sound recorder/player devices such as a Tape/CD/DVD player, MP3 player, Cell phone, Tablet, Laptop, or computer to energize the transmitter coil(s) of an electromagnetic detector. This invention also includes a novel measurement technique to use the input or microphone input channel(s) of the sound player/recorder device such as a cell phone, tablet, laptop, or computer to measure the signal of the receiver coil(s). The detector may employ the processing system of the sound player/recorder device for signal processing and uses its display, vibrator, or other actuators for showing the result or alarming.

BRIEF DESCRIPTION OF THE SEVERAL VIEWS OF THE DRAWING

FIG. 1A, FIG. 1B, FIG. 1C, FIG. 1D, Illustrate the possible winding forms of transmitter coil(s) or receiver coil(s) of the detector.

FIG. 2A, FIG. 2B, FIG. 2C, FIG. 2D, FIG. 2E, FIG. 2F, FIG. 2G, FIG. 2H, FIG. 2I, FIG. 2J, FIG. 2K, Illustrate the possible geometrical cross section shape of transmitter coil(s) or receiver coil(s) of the detector.

FIG. 3A, FIG. 3B, FIG. 3C, FIG. 3D, FIG. 3E, FIG. 3F, are top view diagrams projected in one plane, showing the possible orientation of the coils of the detector in an embodiment with one transmitter coil and one receiver coil.

FIG. 6A, FIG. 6B, FIG. 6C, FIG. 6D, FIG. 6E, FIG. 6F, FIG. 6G, and FIG. 6H are top view diagram in the projected plane, showing the possible orientation of any two coils of the detector in an embodiment with two transmitter coils and one receiver coil.

DETAILED DESCRIPTION OF THE INVENTION

In its simplest form, this detector device and detection method comprises at least a transmitter coil 101 in any form of wire loop with air or any magnetic or non magnetic core connected to an external oscillator or connected to at least one of the sound output channels of a sound or music player/recorder device 104. The sound player/recorder device 104 can be just a player such as a CD player, MP3 player, Video player with sound output, or it may be a sound player and recorder device such as a cell phone, tablet, laptop, computer, smart TV or any device with ability to record and play the sound, voice, or music.

Figure 1A:
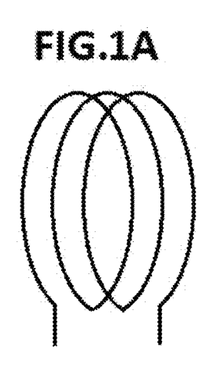
FIG. 1A shows the coils can have any winding form of a solenoid or equal radius disc coil.
Figure 1B:
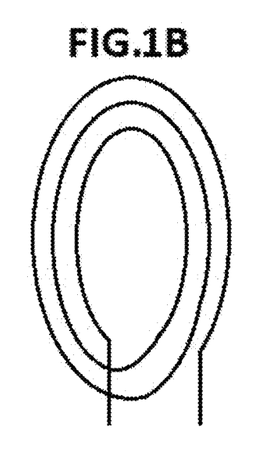
FIG. 1B shows the coils can have any winding form of a spiral or same plane coil.
Figure 1C:
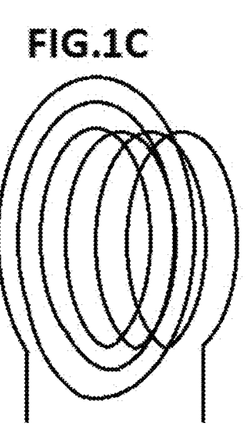
FIG. 1C shows the coils can have any winding form of a combination of solenoid or equal radius coil(s) and spiral or same plane coil(s).
Figure 1D:
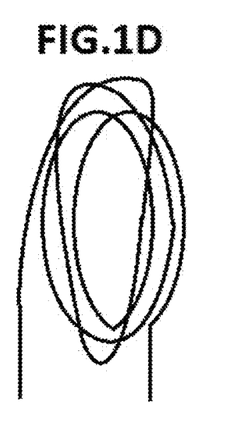
FIG. 1D shows the coils can have any winding form of an arbitrary winded organized or non-organized shaped coil.
Figure 2A:
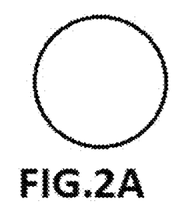
FIG. 2A shows the geometrical cross section shape of transmitter coil(s) or receiver coil(s) of the detector as circle.
Figure 2B:
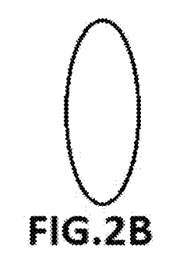
FIG. 2B shows the geometrical cross section shape of transmitter coil(s) or receiver coil(s) of the detector as elliptical or oval.
Figure 2C:
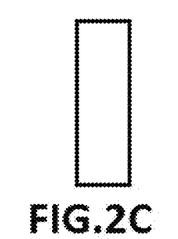
FIG. 2C shows the geometrical cross section shape of transmitter coil(s) or receiver coil(s) of the detector as rectangle.
Figure 2D:
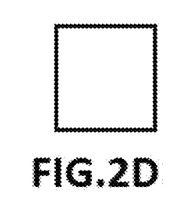
FIG. 2D shows the geometrical cross section shape of transmitter coil(s) or receiver coil(s) of the detector as square.
Figure 2E:
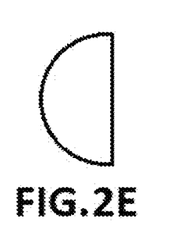
FIG. 2E shows the geometrical cross section shape of transmitter coil(s) or receiver coil(s) of the detector as semi-circle or half circle.
Figure 2F:
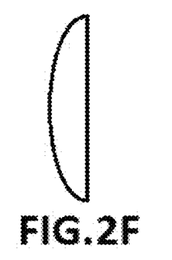
FIG. 2F shows the geometrical cross section shape of transmitter coil(s) or receiver coil(s) of the detector as semi-elliptical or semi-oval or half elliptical or half oval.
Figure 2G:
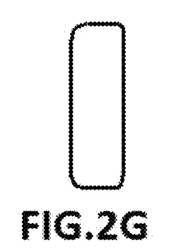
FIG. 2G shows the geometrical cross section shape of transmitter coil(s) or receiver coil(s) of the detector as rectangle with fillet corner.
Figure 2H:
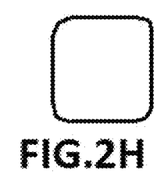
FIG. 2H shows the geometrical cross section shape of transmitter coil(s) or receiver coil(s) of the detector as square with fillet corner.
Figure 2I:
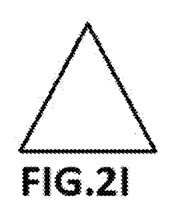
FIG. 2I shows the geometrical cross section shape of transmitter coil(s) or receiver coil(s) of the detector as triangle.
Figure 2J:
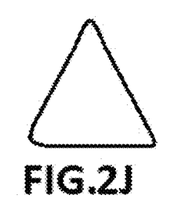
FIG. 2J shows the geometrical cross section shape of transmitter coil(s) or receiver coil(s) of the detector as triangle with fillet corner.
Figure 2K:
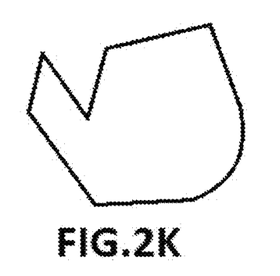
FIG. 2K shows the geometrical cross section shape of transmitter coil(s) or receiver coil(s) of the detector as a combination of two or more numbers of said shapes or any arbitrary shape.

The transmitter coil 101 can have any winding form of a solenoid or equal radius disc coil (FIG. 1A), spiral or same plane coil (FIG. 1B), a combination of solenoid or equal radius coil(s) and spiral or same plane coil(s) (FIG. 1C), or any arbitrary winded organized or non-organized shaped coil (FIG. 1D). As shown in Figures FIG. 2A, FIG. 2B, FIG. 2C, FIG. 2D, FIG. 2E, FIG. 2F, FIG. 2G, FIG. 2H, FIG. 2I, FIG. 2J, FIG. 2K, the transmitter coil 101 can have any geometrical cross section shape such as: circle, semi-circle, half circle, elliptical or oval, semi-elliptical or semi-oval, half elliptical or half oval, square, square with fillet corner, rectangle, rectangle with fillet corner, triangle, triangle with fillet corner, a combination of two or more numbers of the said shapes, or any arbitrary shape.

This detector device and detection method is also comprising at least a receiver coil 102 in any form of wire loop with air or any magnetic or non magnetic core connected to at least one signal measurement device 103 or to at least one of the sound input (microphone) channels of a sound player/recorder device 104 to measure its received signal 106. Signal measurement is defined as the measurement of the amplitude of the voltage/current/power/energy (or any other parameter such as RMS representing the amplitude) in single or multiple frequencies or phase of the voltage/current/power/energy or both amplitude and phase of the voltage/current/power/energy in single or multiple frequencies or frequency measurement of the signal. The receiver coil 102 can have any winding form as shown in figures FIG. 1A, FIG. 1B, FIG. 1C, FIG. 1D and any geometrical cross section shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K.

The signal measurement device 103 can be a simple analog or digital volt meter, amp meter, power meter, or energy meter, or it may be any actuator or indicator that indicates the existence or variation of a voltage or current or power or energy in receiver coil 102. Examples of signal measurement device 103 are: lamp, LED, Headphone, speaker, electromagnetic actuators, and piezo buzzer/actuator.

The music player device 104 sends a continuous or discrete signal 105 to the output channel connected to the transmitter coil 101. The transmitted signal 105 may have any waveform of Sinusoidal, square, rectangle, triangle, pulse, ramp, saw-tooth, or any arbitrary wave form. The said transmitted signal may have a single constant frequency or it may have a time varying frequency, or it may be composed of a combinations of more than one signals with the same or different frequencies or same or different phases or same or different amplitude or any arbitrary periodic or time-varying wave function. For an example, the said transmitted signal may be composed of 15 Sinusoidal signals with same or different amplitudes, frequencies, and phases. The said transmitted signal may also include a DC component (DC offset).

Figure 3A:
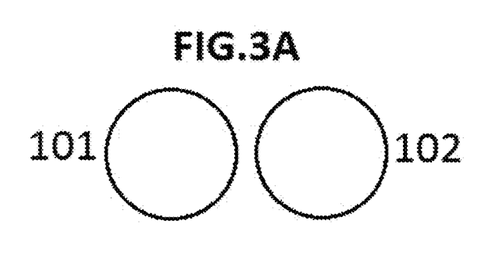
FIG. 3A shows two coils have no overlap in the projected plane.
Figure 3B:
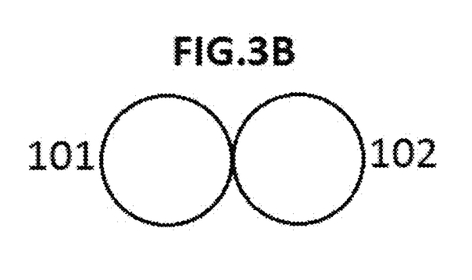
FIG. 3B shows two coils have at least one tangential point in the projected plane.
Figure 3C:
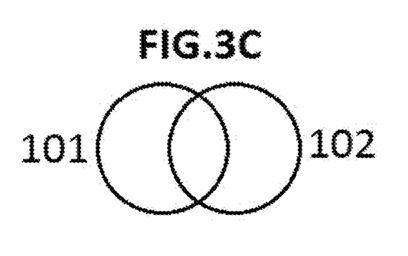
FIG. 3C shows two coils have two overlap points in the projected plane.
Figure 3D:
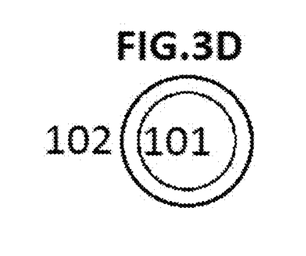
FIG. 3D shows the transmitter coil fits inside the receiver coil in the projected plane.
Figure 3E:
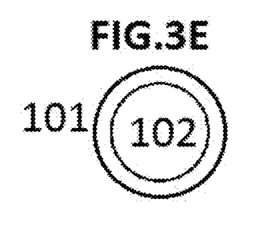
FIG. 3E shows the receiver coil fits inside the transmitter coil in the projected plane.
Figure 3F:
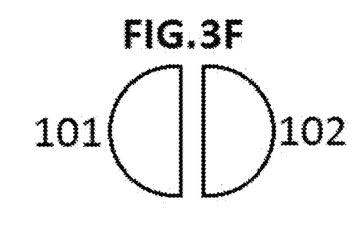
FIG. 3F shows two coils with the shape different than FIG. 3A, have no overlap in the projected plane.

The transmitter coil 101 and the receiver coil 102 can be placed in the same plane or different planes preferably (not necessarily) parallel planes. In top view, the orientation of transmitter coil with respect to the receiver coil may be in any form of FIG. 3A, FIG. 3B, FIG. 3C, FIG. 3D, FIG. 3E: two coils completely separate as shown in FIG. 3A or with a common side (FIG. 3B), or with an overlap (FIG. 3C), or the transmitter coil 101 completely inside the receiver coil 102 (FIG. 3D), or the receiver coil 102 completely inside the transmitter coil 101 (FIG. 3E). It must be emphasized that figures FIG. 3A, FIG. 3B, FIG. 3C, FIG. 3D, FIG. 3E, FIG. 3F, only show the orientation of the coils with respect to each other not the shape of the coils or its winding, the coils are not necessarily in circular shape and may have any wire winging as shown in figures FIG. 1A, FIG. 1B, FIG. 1C, FIG. 1D and any shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K. For example, FIG. 3F shows the same orientation as shown in FIG. 3A, so the orientation shown in FIG. 3A is analogous of the orientation shown in FIG. 3F.

One or more optional transmitter interface device 107 can be placed between the transmitter coil 101 and the sound player/recorder device 104. The transmitter interface device 107 can be an amplifier or pre-amplifier to amplify the transmitted signal 105 or it can be an impedance matching device to enable the connection of the music player device 104 to the transmitter coil 101, or it may be both impedance matching device and amplifier device. For example the transmitter interface device 107 can be a transformer or an op-amp based amplifier or a combination of a transformer and an op-amp based amplifier, or a switching ac to ac converter.

One or more optional receiver interface device 108 can be placed between the receiver coil 102 and the sound player/recorder 104. The receiver interface device 108 can be an amplifier or pre-amplifier to amplify the received signal 106 or it can be an impedance matching device to enable the connection of the input of music player device 104 to the receiver coil 102, or it may be both impedance matching device and amplifier device. For example the receiver interface device 108 can be a transformer or an op-amp based amplifier or a combination of a transformer and an op-amp based amplifier.

Figure 4A:
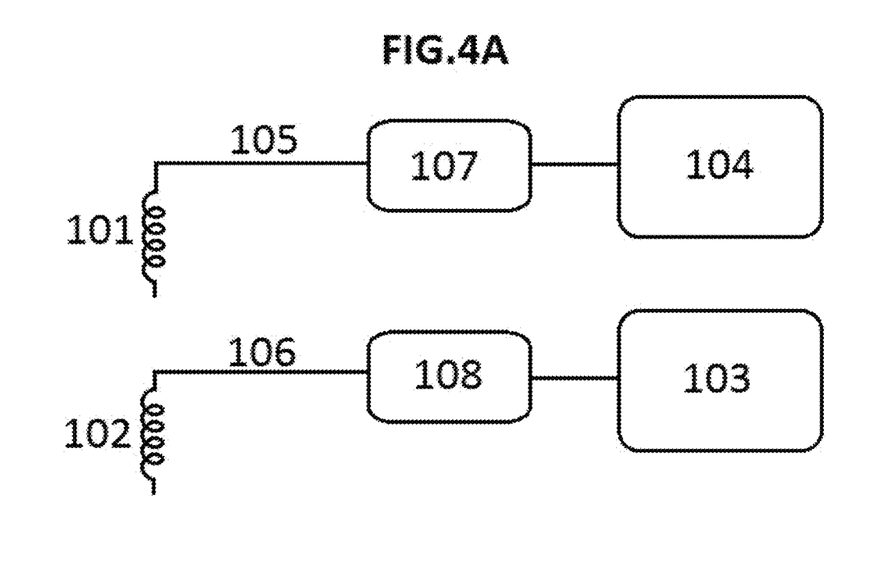
FIG. 4A illustrates the simplest form of the detector where the transmitter coil is energized by a sound playing device and the signal is measured by a measurement device.
Figure 4B:
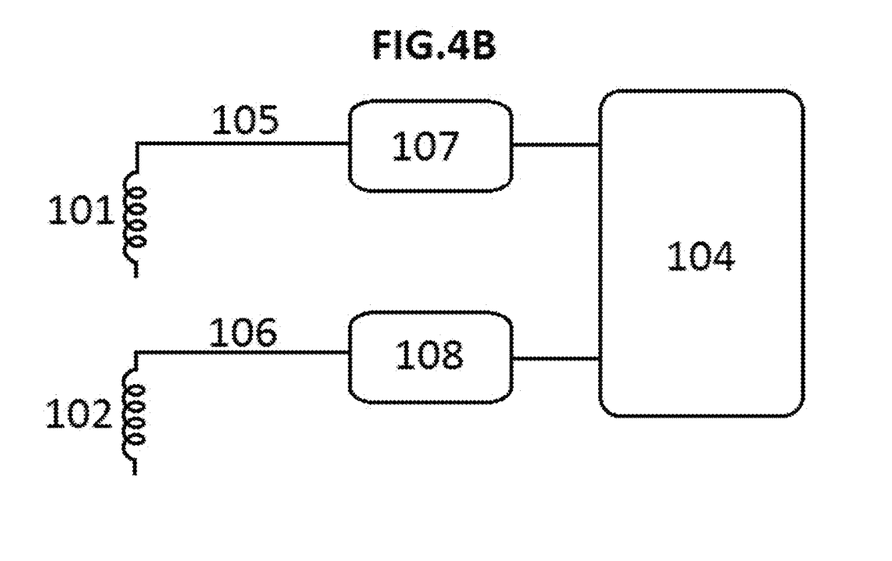
FIG. 4B shows an embodiment of the detector where a music player and recorder device energizes the transmitter coil and also measures the signal of the receiver coil.

FIG. 4A illustrates the simplest form of the detector where the transmitter coil is energized by a sound playing device 104 and the signal is measured by the measurement device. It must be noted that in this Figure the connection of the ground wire is not shown, the ground wire may be common between all units of the circuit or it may be isolated between different parts. The detector can also be practiced in the form of FIG. 4B where a sound/music player and recorder device 104 energizes the transmitter coil 101 and also measures the signal of the receiver coil 102. It must be noted that both FIG. 4A and FIG. 4B show the circuit diagram of the detector device. The winding, physical shape, and orientation of transmitter coil 101 and receiver coil 102 may have any variation introduced in figures FIG. 1A, FIG. 1B, FIG. 1C, FIG. 1D, FIG. 2A, FIG. 2B, FIG. 2C, FIG. 2D, FIG. 2E, FIG. 2F, FIG. 2G, FIG. 2H, FIG. 2I, FIG. 2J, FIG. 2K, FIG. 3A, FIG. 3B, FIG. 3C, FIG. 3D, FIG. 3E, FIG. 3F.

The absolute value of the phase or amplitude of the received signal 106 or the variation of the phase or amplitude of the received signal 106 is an indicator for existence of a metal in proximity of the coils. The direction of the phase shift of the received signal 106 and the amount of the phase shift are used for discrimination of the metal type and approximation of its material structure and estimation of the target distance.

Figure 5A:
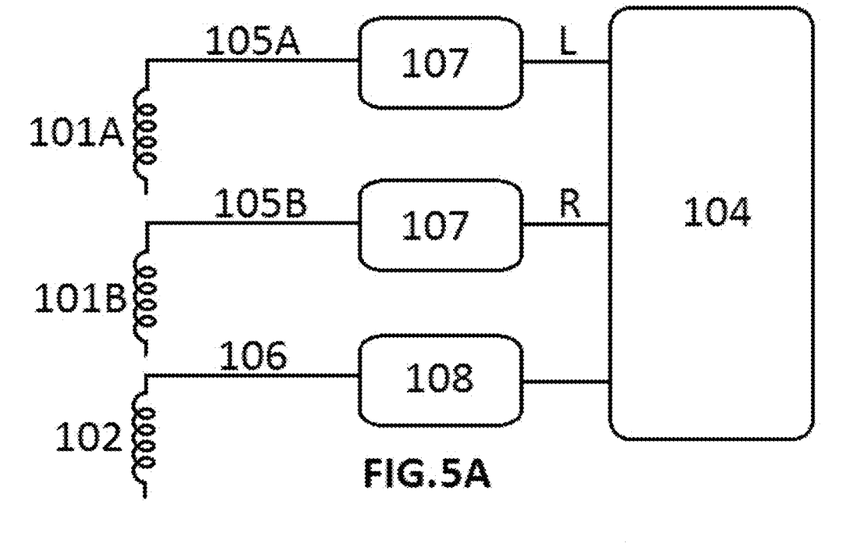
FIG. 5A shows an embodiment of the detector where a sound or music player and recorder device with a stereo (two channel) audio output is employed to energize two transmitter coils and measures the signal of the receiver coil.

While the detector embodiments of FIG. 4A and FIG. 4B are practical and useful because of their simplicity, they require initial adjustments. Such an example, to achieve a high precision long range detection, the shape of coils, their orientation, or distance must be precisely adjusted. In the embodiments of FIG. 4B, the direct transfer of signal from the output audio channel of the sound playing/recording device 104 to its input (microphone) channel affects the detector's performance. To address these issues, the detector embodiment of FIG. 5A is preferred. In the detector embodiment as shown in FIG. 5A a sound player/recorder device 104 with at least a stereo (two channel) audio output is employed. The Left output channel energizes one of the transmitting coil 101A and the Right output channel energizes the other transmitting coil 101B. It must be noted that the Left transmitting coil and right transmitting coil are not necessarily identical; but, there is no significant advantage in employing two non-identical transmitting coils. So, in the preferred embodiment of the detector, two ideally identical transmitting coil 101 are used. Obviously, two transmitting coils when made with the same process/material/dimension cannot be practically identical because of the tolerance in manufacturing and other physical conditions.

The transmitted signal applied to the Left or Right audio channels may have any waveform of Sinusoidal, square, rectangle, triangle, pulse, ramp, saw-tooth, or any arbitrary wave form. The transmitted signal may have a single constant frequency or it may have a time varying frequency, or it may be composed of a combinations of more than one signals with the same or different frequencies or same or different phases or same or different amplitude or any arbitrary periodic or time-varying wave function. The transmitted signal may also include a DC component (DC offset). The transmitted signal 105A applied to the Left and transmitted signal 105B applied to the Right audio channel may be different or identical. In the preferred embodiment of the detector, ideally, the vector summation of the transmitted signal 105A applied to the Left audio channel and the transmitted signal 105B applied to the Right audio channel must be zero. Practically, the transmitter coil 101A connected to the Left and the transmitter coil 101B connected to the Right audio channel are not identical. So, The output audio signals are adjusted in a way to compensate for the imperfection in the coils, to minimize the signal in the receiver coil. For an example, two sinusoidal signals with the same frequency and 180 degree phase shift can be applied to the Left and Right transmitter coils and the ratio between the amplitude of two signals are adjusted in a way that minimizes the amplitude of the voltage in the receiver coil.

Figure 6A:
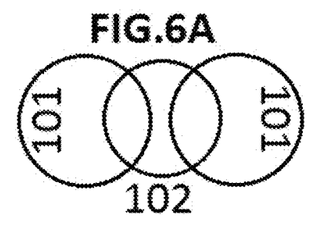
FIG. 6A shows two transmitter coils have no overlap point in the projected plane and each transmitter coil has two overlap points with the receiver coil in the projected plane.

Three coils of the detector embodiment shown in FIG. 5A including two transmitter coils and one receiver coil may have any random orientation with respect to each other. For example all three coils may be completely separate or may be placed in the same plane or different planes or at least two of them may have overlap with each other or all three may have mutual overlap. In the preferred embodiments of the detector:

(a) All three coils may have any wire winding as shown in figures FIG. 1A, FIG. 1B, FIG. 1C, FIG. 1D, and the thickness and cross section shape and area of the coils' wires may have any shape and value, and three coils may have any shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K, (for example if the coil is shown as a circle in this Figure, it is not necessarily circle, it might be semi-circle, rectangle or any other shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K,) and coils may have any size, not necessarily the same size, even if shown equal in the Figure. Two transmitter coils are placed in the preferably (but not necessarily) same plane and the receiver coil is placed in another plane preferably (but not necessarily) parallel with the plane of transmitter coils. Two transmitter coils are completely separate. In top view, both transmitter coils have an overlap with the receiver coil as shown in FIG. 6A. The coils are not necessarily aligned in the same line, for example the receiver coil 102 may be positioned above the shown place (in +Y direction). The distance between the coil 102 and the transmitter coils are not necessarily the same and the diameter and the size of coils are not necessarily equal or similar.

Figure 6B:
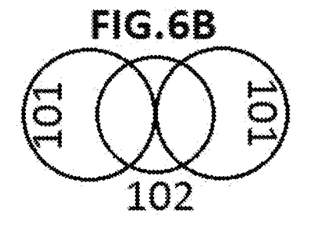
FIG. 6B shows two transmitter coils have at least one overlap point in the projected plane and each transmitter coil has two overlap points with the receiver coil in the projected plane.

(b) All three coils may have any wire winding as shown in figures FIG. 1A, FIG. 1B, FIG. 1C, FIG. 1D, and the thickness and cross section shape and area of the coils' wires may have any shape and value, and three coils may have any shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K, (for example if the coil is shown as a circle in this Figure, it is not necessarily circle, it might be semi-circle, rectangle or any other shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K,) and coils may have any size, not necessarily the same size, even if shown equal in the Figure. Two transmitter coils are placed in the preferably (but not necessarily) same plane and the receiver coil is placed in another plane preferably (but not necessarily) parallel with the plane of transmitter coils. Two transmitter coils have a common side. In top view, both transmitter coils have an overlap with the receiver coil as shown in FIG. 6B. The coils are not necessarily aligned in the same line, for example the receiver coil 102 may be positioned above the shown place (in +Y direction). The distance between the coil 102 and the transmitter coils are not necessarily the same and the diameter and the size of coils are not necessarily equal or similar.

Figure 6C:
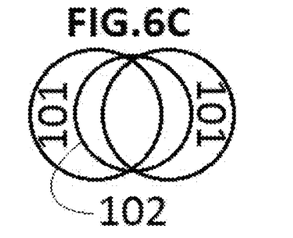
FIG. 6C shows two transmitter coils have two overlap points in the projected plane and each transmitter coil has two overlap points with the receiver coil in the projected plane.

(c) All three coils may have any wire winding as shown in figures FIG. 1A, FIG. 1B, FIG. 1C, FIG. 1D, and the thickness and cross section shape and area of the coils' wires may have any shape and value, and three coils may have any shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K, (for example if the coil is shown as a circle in this Figure, it is not necessarily circle, it might be semi-circle, rectangle or any other shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K,) and coils may have any size, not necessarily the same size, even if shown equal in the Figure. Two transmitter coils are placed in different preferably (but not necessarily) parallel planes and the receiver coil is placed in a plane different than the plane of any of the transmitter coils. The plane of receiver coil is preferably (but not necessarily) parallel to the plane of one of the transmitter coils. In the top view, two transmitter coils have an overlap with each other and both transmitter coils have overlap with the receiver coil as shown in FIG. 6C. The coils are not necessarily aligned in the same line, for example the receiver coil 102 may be positioned above the shown place (in +Y direction). The distance between the coil 102 and the transmitter coils are not necessarily the same and the diameter and the size of coils are not necessarily equal or similar.

Figure 6D:
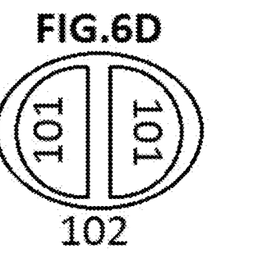
FIG. 6D shows two transmitter coils have no overlap point in the projected plane and transmitter coils fit inside the receiver coil in the projected plane.

(d) All three coils may have any wire winding as shown in figures FIG. 1A, FIG. 1B, FIG. 1C, FIG. 1D, and the thickness and cross section shape and area of the coils' wires may have any shape and value, and three coils may have any shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K, (for example if the coil is shown as a circle in this Figure, it is not necessarily circle, it might be semi-circle, rectangle or any other shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K) and coils may have any size, not necessarily the same size, even if shown equal in the Figure. Two transmitter coils are placed in the preferably (but not necessarily) same plane and the receiver coil is placed in another plane preferably (but not necessarily) parallel with the plane of transmitter coils. Two transmitter coils are completely separate. In top view, the receiver coil surrounds at least one of the transmitter coils as shown in FIG. 6D. The coils are not necessarily aligned in the same line, for example the receiver coil 102 may be positioned above the shown place (in +Y direction). The distance between the coil 102 and the transmitter coils are not necessarily the same and the diameter and the size of coils are not necessarily equal or similar.

Figure 6E:
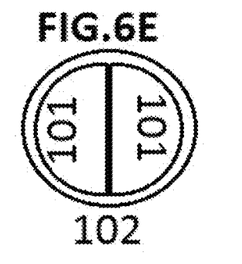
FIG. 6E shows two transmitter coils have at least one overlap point in the projected plane and transmitter coils fit inside the receiver coil in the projected plane.

(e) All three coils may have any wire winding as shown in figures FIG. 1A, FIG. 1B, FIG. 1C, FIG. 1D, and the thickness and cross section shape and area of the coils' wires may have any shape and value, and three coils may have any shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K, (for example if the coil is shown as a circle in this Figure, it is not necessarily circle, it might be semi-circle, rectangle or any other shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K) and coils may have any size, not necessarily the same size, even if shown equal in the Figure. Two transmitter coils are placed in the preferably (but not necessarily) same plane and the receiver coil is placed in another plane preferably (but not necessarily) parallel with the plane of transmitter coils. Two transmitter coils have a common side. In top view, the receiver coil surrounds at least one of the transmitter coils as shown in FIG. 6E. The coils are not necessarily aligned in the same line, for example the receiver coil 102 may be positioned above the shown place (in +Y direction). The distance between the coil 102 and the transmitter coils are not necessarily the same and the diameter and the size of coils are not necessarily equal or similar.

Figure 6F:
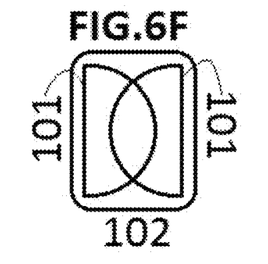
FIG. 6F shows two transmitter coils have two overlap points in the projected plane and transmitter coils fit inside the receiver coil in the projected plane.

(f) All three coils may have any wire winding as shown in figures FIG. 1A, FIG. 1B, FIG. 1C, FIG. 1D, and the thickness and cross section shape and area of the coils' wires may have any shape and value, and three coils may have any shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K, (for example if the coil is shown as a circle in this Figure, it is not necessarily circle, it might be semi-circle, rectangle or any other shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K) and coils may have any size, not necessarily the same size, even if shown equal in the Figure. Two transmitter coils are placed in different preferably (but not necessarily) parallel planes and the receiver coil is placed in a plane different than the plane of any of the transmitter coils. The plane of receiver coil is preferably (but not necessarily) parallel to the plane of one of the transmitter coils. In top view, two transmitter coils have an overlap and the receiver coil surrounds at least one of the transmitter coils as shown in FIG. 6F. The coils are not necessarily aligned in the same line, for example the receiver coil 102 may be positioned above the shown place (in +Y direction). The distance between the coil 102 and the transmitter coils are not necessarily the same and the diameter and the size of coils are not necessarily equal or similar.

Figure 6G:
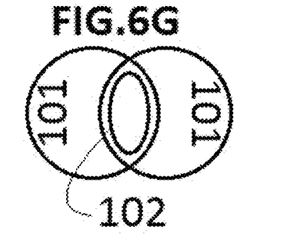
FIG. 6G shows two transmitter coils have two overlap points in the projected plane and receiver coil fits inside the transmitter coils in the projected plane.

(g) All three coils may have any wire winding as shown in figures FIG. 1A, FIG. 1B, FIG. 1C, FIG. 1D, and the thickness and cross section shape and area of the coils' wires may have any shape and value, and three coils may have any shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K, (for example if the coil is shown as a circle in this Figure, it is not necessarily circle, it might be semi-circle, rectangle or any other shape as shown in figures FIG. 2A, FIG. 2B, FIG. 2C, FIG. 2D, FIG. 2E, FIG. 2F, FIG. 2G, FIG. 2H, FIG. 2I, FIG. 2J, FIG. 2K) and coils may have any size, not necessarily the same size, even if shown equal in the Figure. Two transmitter coils are placed in different preferably (but not necessarily) parallel planes. The plane of receiver coil is preferably (but not necessarily) equal or parallel to the plane of one of the transmitter coils. In the top view, two transmitter coils have an overlap with each other and at least one of the transmitter coils surround the receiver coil as shown in FIG. 6G. The coils are not necessarily aligned in the same line, for example the receiver coil 102 may be positioned above the shown place (in +Y direction). The distance between the coil 102 and the transmitter coils are not necessarily the same and the diameter and the size of coils are not necessarily equal or similar.

Figure 5B:
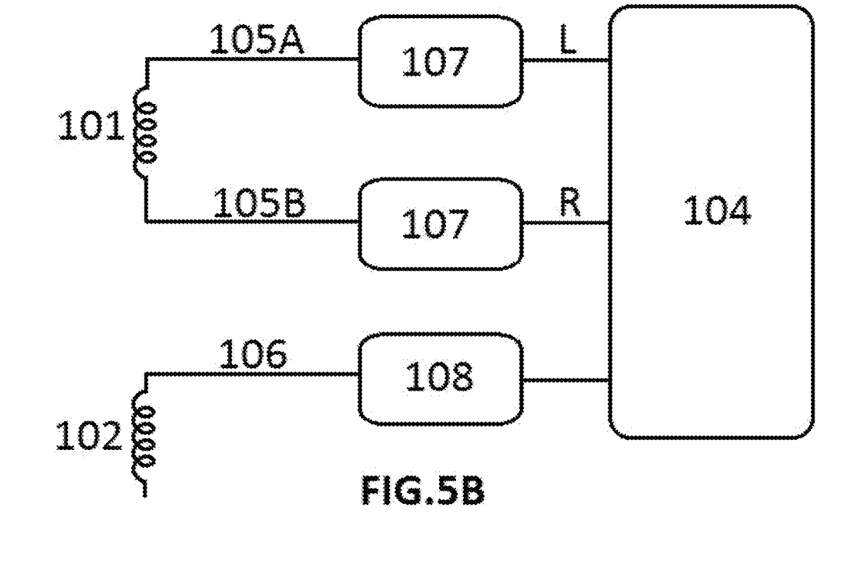
FIG. 5B shows an embodiment of the detector where a sound or music player and recorder device with a stereo (two channel) audio output is employed to energize one transmitter coil and measures the signal of the receiver coil

For its deep detection depth and simplicity, the detector embodiment of FIG. 5B is also preferred. In the detector embodiment as shown in FIG. 5B a sound player/recorder device 104 with at least a stereo (two channel) audio output is employed. The Left output channel and the Right output channel energize the transmitting coil 101.

It must be noted that in all embodiments explained above, All coils may have any wire winding as shown in figures FIG. 1A, FIG. 1B, FIG. 1C, FIG. 1D, and the thickness and cross section shape and area of the coils' wires may have any shape and value, and three coils may have any shape as shown in figures FIG. 2A, FIG. 2B, FIG. 2C, FIG. 2D, FIG.

Figure 6H:
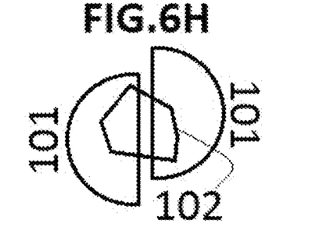
FIG. 6H shows an embodiment analogous to the embodiment of FIG. 6A.

2E, FIG. 2F, FIG. 2G, FIG. 2H, FIG. 2I, FIG. 2J, FIG. 2K, and coils may have any size, not necessarily the same size, even if shown equal in the Figure. As an example, FIG. 6H shows an embodiment analogous to the embodiment of FIG. 6A because in includes two transmitter coil separate from each other that both have overlap with an arbitrary shaped receiver coil.

In the embodiment of FIG. 5A and FIG. 5B the absolute value of the phase or amplitude of the received signal 106 or the variation of the phase or amplitude of the received signal 106 is an indicator for existence of a metal in proximity of the coils. The direction of the phase shift of the received signal 106 and/or the amount of the phase shift and/or the amount of amplitude change in single or multiple frequencies are used for discrimination of the metal type and approximation of its material structure and estimation of the target distance.

Figure 7:
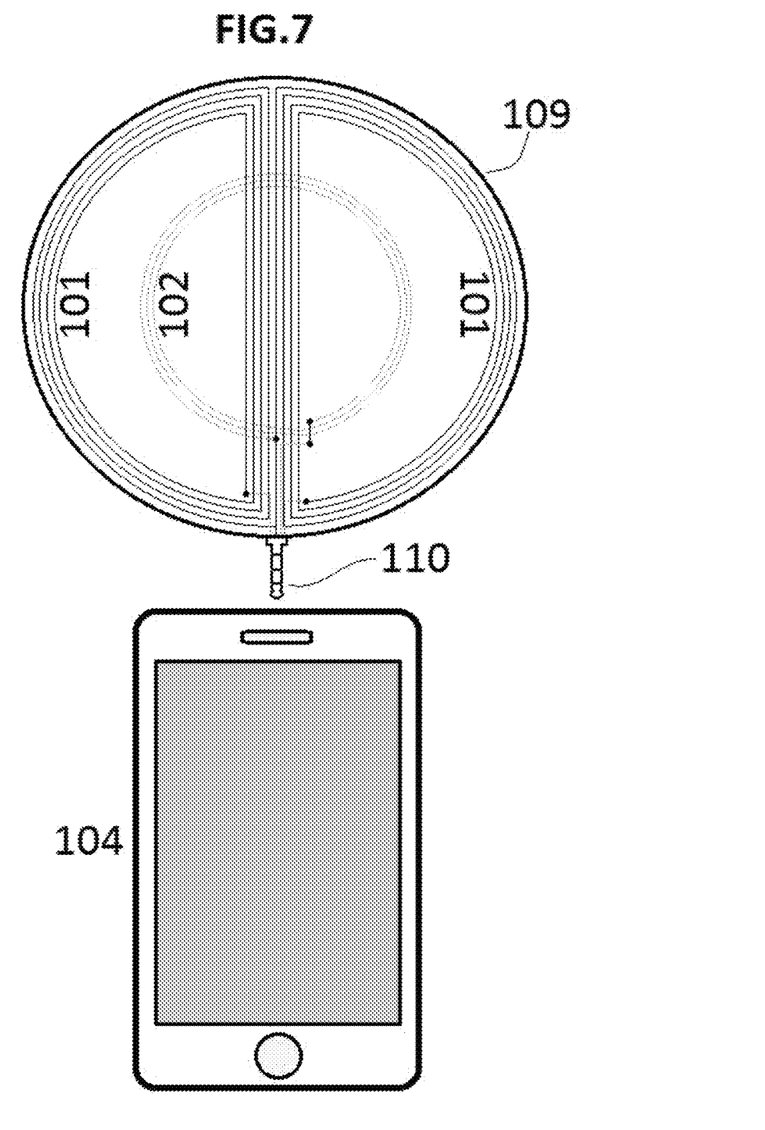
FIG. 7 Shows an example of practical embodiment for the detector structure shown in FIG. 5.

FIG. 7 shows an example of practical embodiment for the detector structure shown in FIG. 5A and FIG. 5B. In this example the sound player/recorder device 104 is a smartphone. The transmitter coils 101 and receiver coil 102 are made on a Printed Circuit Board (PCB) 109 and they have the wire winding structure of FIG. 1B. The wires of the coils are connected to the headset port of the smart-phone via a 4 pin audio jack 110. The PCB 109 as shown in FIG. 7 is a two-layer board. In a practical design, more turns of wires or wires with larger cross section area may be needed for either of the transmitters or receiver coils. Hence, a multi-layer (more than two layers) PCB may be used. In that case, wire winding in different layers of the PCB may be combined (in a series or parallel connection) to form a larger coil. At least one of the coils can also be manufactured outside of the PCB. For example, the receiver coil can be formed as a spool of magnet wires that are soldered to the PCB 109.

The detector structure can also be practiced using a sound player/recorder device 104 with one or more than one input channel(s) and or one or more than one output channel(s). M output channel(s) of the sound player/recorder device 104 and N input channel(s) of the sound player/recorder device 104 can be used in the detector's embodiment, where M is equal or smaller than the total output channel(s) of the sound player/recorder device 104 and N is equal or smaller than the total input channel(s) of the sound player/recorder device 104.

M output channels of the sound player/recorder device 104 can be directly connected to at least M transmitting coil(s) 101 or they can be connected to the transmitting coils via optional transmitter interface device(s) 107. It must be noted that M transmitting coil(s) are not necessarily identical and each coil can also be a series or parallel combination of more than one coil.

The transmitted signal(s) 105 applied to the output channel(s) may have any waveform of Sinusoidal, square, rectangle, triangle, pulse, ramp, saw-tooth, or any arbitrary wave form. The said transmitted signal(s) may have a single constant frequency or may have a time varying frequency, or may be composed of a combinations of more than one signals with the same or different frequencies or same or different phases or same or different amplitude or any arbitrary periodic or time-varying wave function. The said transmitted signal(s) may also include a DC component (DC offset). The transmitted signal(s) 105 applied to M output audio channel(s) may be different or identical. M output channel(s) of the device 104 can also be categorized in one or more similar or different cluster(s) of similar coils. Ideally, the vector summation of the transmitted signals 105 applied to all coils of each cluster is zero. The signal of the receiver coil(s) can be independently measured using input channel(s) of the device 104, or each group of receiver coils can form a cluster comprising a series or parallel connection of receiver coils and the signal of the cluster is measured by one input channel. Each single receiver coil or each cluster of input coils can be directly connected to the input channel(s) or an optional receiver interface device 108 can be placed between each single receiver coil or cluster and the sound player/recorder input channel.

Figure 8:
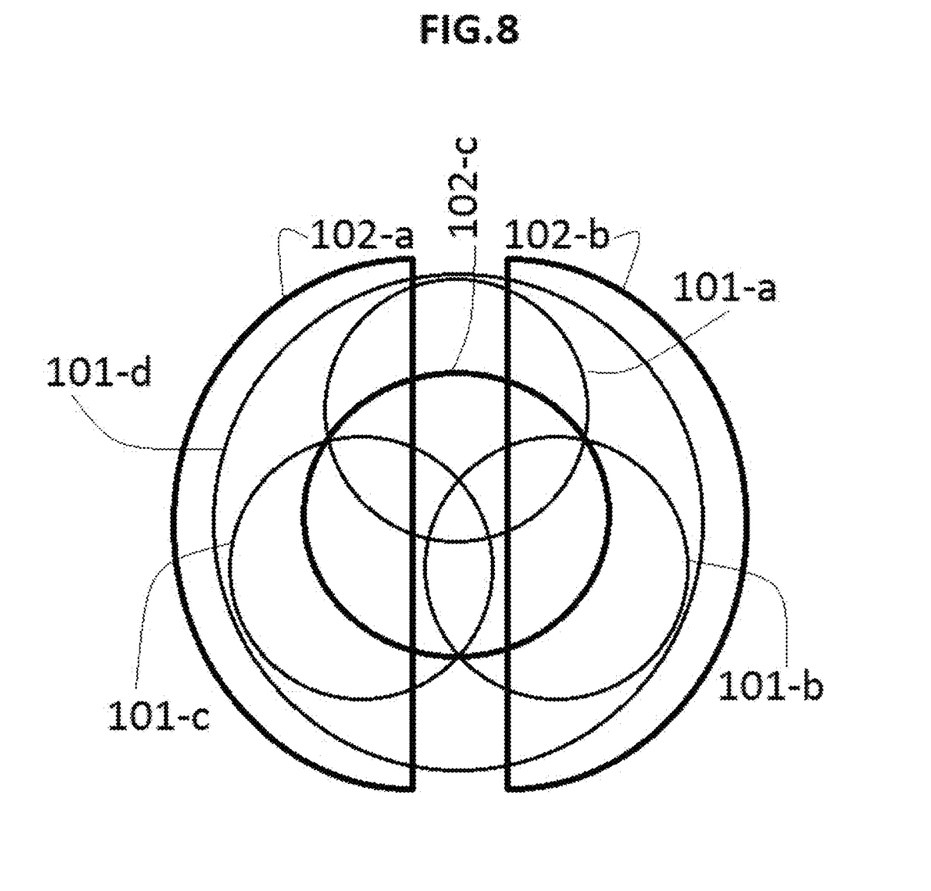
FIG. 8 shows a complex embodiment of the detector with M=4 and N=2.

Practical values for the used numbers of output channel(s) of the sound player/recorder device 104 can be any number between 1 and 32 and above 32 (M=1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, M>32). Practical values for the used numbers of input channel(s) of the sound player/recorder device 104 can be any number between 1 and 32 and above 32 (N=1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, N>32). Higher numbers of input or output channels can be employed for more precise detection, covering a larger area without missing the sensitivity for small objects, pinpointing, power saving, target depth estimation, and target size estimation. For an example, FIG. 8 shows a complex embodiment with M=4 and N=2. In this embodiment, transmitting coils 101-a, 101-b, 101-c, 101-d are connected to 4 input channels of the device 104 and the receiver coil 102-c is connected to one of the input channels of the device 104 and a series combination of receiving coils 102-a and 102-b is connected to the other input channel of the device 104 (winding direction of the coil 102-a is apposite of the winding direction of the coil 102-b). Transmitting coils 101-a, 101-b, and 101-c are forming a cluster. Three sinusoidal signals with 120 degree phase difference, the same frequency, and similar (but not necessarily the same due to the imperfection in manufacturing of the coils) amplitude are applied to transmitting coils 101-a, 101-b, and 101-c. Another transmitted signal with lower frequency is applied to the transmitting coil 101-d. The signal in the receiving coil 102-c and the signal in the cluster of coil 102-a and coil 102-b is measured. In this embodiment, smaller coils make more sensitivity to the smaller object and larger coils provide a longer range for the larger object, the detector also has both advantages of low frequency and high frequency measurements. In such a system, the output signals can be sent to the transmitter coils at the same time or in different time sequences for better discrimination and localization and pin pointing.

The sound player/recorder device 104 used in the detector device and the detection method of this invention may only play a sound file, or it may run an app that sends desired signal to the output channel(s) and measures the signal received to the input channel(s) of the sound player/recorder device 104.

The detector device or the detection method of this invention or the said app of the detector can use the GPS modules of the sound player/recorder device 104 to find the acceleration, speed, or location of the detector device or the location of the detected object.

The detector device or the detection method of this invention or said app of the detector can use the accelerometer or gyroscope device of the sound player/recorder device 104 to measure the position, movement, velocity, or acceleration of the coils for noise filtering and improving the measurement accuracy.

The detector device or the detection method of this invention or said app of the detector can use the vibrator of the sound player/recorder device 104 to alarm or indicate the detection of an object.

The detector device or the detection method of this invention or said app of the detector can use the speaker of the sound player/recorder device 104 to notify, alarm or indicate the detection of an object.

The detector device or the detection method of this invention or said app of the detector can use the Bluetooth or WiFi module of the sound player/recorder device 104 to communicate with an external device such as a wireless headphone to indicate the detection of an object or send the size, shape, distance, and material information of the detected object to the external alarm or display devices.

The detector device or the detection method or said app of the detector of this invention can use the display or keyboard or touch screen of the sound player/recorder device 104 to receive the input parameters or show the measurement results of the detector.

The detector device or the detection method of this invention or said app of the detector can use the processor and processing capabilities of the sound player/recorder device 104 to send the transmitted signal(s) to the output channel(s) and receive and process the received signal(s) to the input channel(s) of the sound player/recorder device 104.

The detector device or the detection method of this invention or said app of the detector can use the memories of the sound player/recorder device 104 to record the location data, information about the detected objects, or pictures or videos taken from the environment wile using the detector device.

The detector device or the detection method of this invention or said app of the detector can use the camera of the sound player/recorder device 104 to record and save videos or take or save pictures from the detected objects, the user, the detector, or environment.

The detector device or the detection method of this invention or said app of the detector can measures the distance and/or displacement and/or velocity and/or linear vibration of at least one coil with respect to the other by measuring the absolute value and/or variation in the amplitude and/or phase and/or frequency of received signal while the distance between two coils varies.

The detector device or the detection method of this invention or said app of the detector can measure the angular position and/or angular displacement and/or rotational speed and/or angular vibration of one coil with respect to another coil by measuring the absolute value and/or variation in the amplitude and/or phase and/or frequency of a received signal while the angle between two coils varies.nal 106 while the angle between said receiver coil 102 and said transmitter coil 101 varies The detector device or the detection method of this invention or said app of the detector can measure the distance and/or displacement and/or velocity and/or angular position and/or angular displacement and/or rotational speed and/or vibration of a metal and/or magnetic and/or conductive object in proximity of coils by measuring the absolute value and/or variation in the amplitude and/or phase and/or frequency of said received signal.

The invention claimed is:

1. A detector device using at least one output audio channel of a sound playing/recording device including cellphone, smart-phone, tablet, laptop, computer, CD player, MP3 player, video player with sound output, smart TV, wherein said detector device comprises:

a transmitter coil with one grounded lead and the other lead energized by one of the said output audio channel of said sound playing/recording device; or a transmitter coil energized by two of the said output audio channels of said sound playing/recording device wherein each lead of said transmitter coil is connected to one of the said output audio channel of said sound playing/recording device; or multiple transmitter coils with any numbers from +2, to 32 and having one common grounded lead and the other lead of each of said multiple transmitter coil: is connected to one of the said output audio channel of said sound playing/recording device; or multiple transmitter coils with any numbers from 2+ to 32 wherein each of said multiple transmitter coils is connected to two of the said output audio channels of said sound playing/recording device; wherein each of the said transmitter coil and said sound playing/recording device or each of said multiple transmitter coils and said sound playing/recording device have interface connection or combinations of interface connections between the transmitter coil and sound playing/recording device comprising:

said sound playing/recording device is directly connected to said transmitter coil or said multiple transmitter coils; or an amplifier is placed between said sound playing/recording device and said transmitter coil or said multiple transmitter coils; or an impedance matching system is placed between said sound playing/recording device and said transmitter coil or said multiple transmitter coils; or a frequency multiplier or frequency shifter system is placed between said sound playing/recording device and said transmitter coil or said multiple transmitter coils;

a receiver coil, wherein said receiver coil receives a received signal, wherein a signal measurement device measures amplitude or phase or frequency of a voltage or current or power or energy of said received signal, wherein said signal measurement device comprises:

an analog or digital volt meter, or amp meter, or power meter, or energy meter, or phase meter;

wherein said receiver coil and said signal measurement device have interface connection or combinations of interface connections between the receiver coil and signal measurement device comprising:

the signal measurement device is directly connected to said receiver coil; or an amplifier is placed between said signal measurement device and said receiver coil; or an impedance matching system is placed between said signal measurement device and said receiver coil; or a frequency multiplier or frequency shifter system is placed between said signal measurement device and said receiver coil.

2. The detector device of claim 1, wherein said detector device is a metal detector, conductor detector, or magnetic material detector that detects targets by measuring absolute value of or variation in the amplitude, phase, or frequency of said received signal.

3. The detector device of claim 2, wherein said detector device determines the type of a target material, wherein said detector device stores the absolute values of or variation in the amplitude, phase, or frequency signature of each material and compares said received signal with stored signature data to match said target material with most similar materials.

4. The detector device of claim 1, wherein the distance between said receiver coil and said transmitter coil or the distance between said receiver coil and said multiple transmitter coils is not constant.

5. The detector device of claim 1, wherein the angle between said receiver coil and said transmitter coil or the angle between said receiver coil and said multiple transmitter coils is not constant.

6. The detector device of claim 1, wherein a static or a dynamic metal, magnetic object, or conductive object is in proximity of said receiver coil or said transmitter coil said multiple transmitter coils.

7. A detector device using at least one input audio channel of a sound playing/recording device including cell-phone, smart-phone, tablet, laptop, computer, CD player, MP3 player, video player with sound input, smart TV, wherein said detector device comprises:
- a transmitter coil energized with a signal generator wherein each said transmitter coil and said signal generator have interface connection or combinations of interface connections between the transmitter coil and signal generator comprising:
  - said signal generator is directly connected to said transmitter coil; or an amplifier is placed between said signal generator and said transmitter coil; or an impedance matching system is placed between said signal generator and said transmitter coil; or a frequency multiplier or frequency shifter system is placed between said signal generator and said transmitter coil;
- a receiver coil, wherein said receiver coil receives a received signal, wherein the amplitude or phase or frequency of a voltage or current or power or energy of said received signal is being measured by one of the said input audio channel of said sound playing/recording device, wherein said receiver coil has one grounded lead and the other lead is being measured by one of the said input audio channel of said sound playing/recording device; or a receiver coil is being measured by two of the said input audio channels of said sound playing/recording device, wherein each lead of said receiver coil is being measured by one of the said input audio channel of said sound playing/recording device; or multiple receiver coils with any numbers from 2 to 32 and having one common grounded lead and the other lead of each said multiple receiver coils is connected to one of the said input audio channel of said sound playing/recording device; or multiple receiver coils with any numbers from 2 to 32 wherein each said multiple receiver coils is connected to two of the said input audio channels of said sound playing/recording device;
  - wherein said receiver coil and said sound playing/recording device or said multiple receiver coils and said sound playing/recording device have interface connection or combinations of interface connections between the receiver coil and sound playing/recording device comprising:
    - said sound playing/recording device is directly connected to said receiver coil or said multiple receiver coils; or an amplifier is placed between said sound playing/recording device and said receiver coil or said multiple receiver coils; or an impedance matching system is placed between said sound playing/recording device and said receiver coil or said multiple receiver coils; or a frequency multiplier or frequency shifter system is placed between said sound playing/recording device and said receiver coil, or said multiple receiver coils.

8. The detector device of claim 7, wherein said detector device is a metal detector, conductor detector, or magnetic material detector that detects targets by measuring absolute value of or variation in the amplitude, phase, or frequency of said received signal.

9. The detector device of claim 8, wherein said detector device determines the type of a target material, wherein said detector device stores the absolute values of or variation in the amplitude, phase, or frequency signature of each material and compares said received signal with stored signature data to match said target material with most similar materials.

10. The detector device of claim 7, wherein the distance between said receiver coil and said transmitter coil or the distance between said multiple receiver coils and said transmitter coil is not constant.

11. The detector device of claim 7, wherein the angle between said receiver coil and said transmitter coil or the angle between said multiple receiver coils and said transmitter coil is not constant.

12. The detector device of claim 7, wherein a static or a dynamic metal, magnetic object, or conductive object is in proximity of said receiver coil or said transmitter coil or said multiple receiver coils.

13. A detector device using at least one input audio channel and at least one output audio channel of a sound playing/recording device including cell-phone, smart-phone, tablet, laptop, computer, CD player, MP3 player, video player with sound output and sound input, smart TV, wherein said detector device comprises:
- a transmitter coil with one grounded lead and the other lead energized by one of the said output audio channel of said sound playing/recording device; or a transmitter coil energized by two of the said output audio channels of said sound playing/recording device wherein each lead of said transmitter coil is connected to one of the said output audio channel of said sound playing/recording device; or multiple transmitter coils with any numbers from 2 to 32 and having one common grounded lead and the other lead of each said multiple transmitter coils is connected to one of the said output audio channel of said sound playing/recording device; or multiple transmitter coils with any numbers from 2 to 32 wherein each said multiple transmitter coils is connected to two of the said output audio channels of said sound playing/recording device;
  - wherein each transmitter coil and said sound playing/recording device or each said multiple transmitter coils and said sound playing/recording device have interface connection or combinations of interface connections between the transmitter coil and sound playing/recording device comprising:
    - said sound playing/recording device is directly connected to said transmitter coil or said multiple transmitter coils; or an amplifier is placed between said sound playing/recording device and said transmitter coil or said multiple transmitter coils; or an impedance matching system is placed between said sound playing/recording device and said transmitter coil or said multiple transmitter coils; or a frequency multiplier or frequency shifter system is placed between said sound playing/recording device and said transmitter coil or said multiple transmitter coils;

a receiver coil, wherein said receiver coil receives a received signal, wherein the amplitude or phase or frequency of a voltage or current or power or energy of said received signal is being measured by one of the said input audio channel of said sound playing/recording device, wherein said receiver coil has one grounded lead and the other lead is being measured by one of the said input audio channel of said sound playing/recording device; or a receiver coil is being measured by two of the said input audio channels of said sound playing/recording device, wherein each lead of said receiver coil is being measured by one of the said input audio channel of said sound playing/recording device; or multiple receiver coils with any numbers from 2 to 32 and having one common grounded lead and the other lead of each said multiple receiver coils is connected to one of the said input audio channel of said sound playing/recording device;

wherein said receiver coil and said input audio channel of said sound playing/recording device or said multiple receiver coils and said input audio channel of said sound playing/recording device have interface connection or combinations of interface connections comprising:

said sound playing/recording device is directly connected to said receiver coil or said multiple receiver coils; or an amplifier is placed between said sound playing/recording device and said receiver coil or said multiple receiver coils; or an impedance matching system is placed between said sound playing/recording device and said receiver coil or said multiple receiver coils; or a frequency multiplier or frequency shifter system is placed between said sound playing/recording device and said receiver coil or said multiple receiver coils.

14. The detector device of claim 13, wherein said detector device is a metal detector, conductor detector, or magnetic material detector that detects targets by measuring absolute value of or variation in the amplitude, phase, or frequency of said received signal.

15. The detector device of claim 14, wherein said detector device determines the type of a target material, wherein said detector device stores the absolute values of or variation in the amplitude, phase, or frequency signature of each material and compares said received signal with stored signature data to match said target material with most similar materials.

16. The detector device of claim 13, wherein the distance between said receiver coil and said transmitter coil or the distance between said receiver coil and said multiple transmitter coils or the distance between said transmitter coil and said multiple receiver coils or the distance between said multiple transmitter coils and said multiple receiver coils is not constant.

17. The detector device of claim 13, wherein the angle between said receiver coil and said transmitter coil or the angle between said receiver coil and said multiple transmitter coils or the angle between said transmitter coil and said multiple receiver coils or the angle between said multiple transmitter coils and said multiple receiver coils is not constant.

18. The detector device of claim 13, wherein a static or a dynamic metal, magnetic object, or conductive object is in proximity of said receiver coil or said transmitter coil or said multiple receiver coils or said multiple transmitter coils.

* * * * *